(12) United States Patent
Kutty et al.

(10) Patent No.: US 10,574,596 B2
(45) Date of Patent: Feb. 25, 2020

(54) SOFTWARE DEFINED NETWORKING FCOE INITIALIZATION PROTOCOL SNOOPING BRIDGE SYSTEM

(71) Applicant: Dell Products L.P., Round Rock, TX (US)

(72) Inventors: Ajan Daniel Kutty, Austin, TX (US); Srinivasa Rao Nagalla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 15/603,214

(22) Filed: May 23, 2017

(65) Prior Publication Data

US 2018/0343209 A1 Nov. 29, 2018

(51) Int. Cl.
*H04L 12/937* (2013.01)
*H04L 12/721* (2013.01)
*H04L 12/931* (2013.01)
*H04L 29/08* (2006.01)

(52) U.S. Cl.
CPC ............ *H04L 49/254* (2013.01); *H04L 45/66* (2013.01); *H04L 49/357* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 9,942,144 | B1* | 4/2018 | Ramalingam | H04L 45/745 |
| 2009/0296726 | A1* | 12/2009 | Snively | H04L 45/66 370/401 |
| 2012/0106957 | A1* | 5/2012 | Willeke | H04L 29/12207 398/58 |
| 2012/0263187 | A1* | 10/2012 | Belanger | H04L 49/15 370/401 |
| 2012/0275301 | A1* | 11/2012 | Xiong | H04L 49/357 370/230 |
| 2015/0200802 | A1* | 7/2015 | Sawal | H04L 45/22 370/228 |
| 2016/0087886 | A1* | 3/2016 | Hughes | H04L 45/74 370/254 |

* cited by examiner

*Primary Examiner* — Philip J Chea
*Assistant Examiner* — Hassan A Khan
(74) *Attorney, Agent, or Firm* — Haynes and Boone, LLP (57) ABSTRACT

An FSB-enabled SDN system includes an FC storage device coupled to an FSB device by an FCF device. An SDN FSB device couples a server device to the FCF device, and is also coupled to an SDN controller device. The SDN FSB device prevents first FCoE data traffic while allowing FIP data traffic between the server device and the FCF device based on SDN communications from the SDN controller device. The SDN FSB device then forwards FC login communications included in the FIP data traffic to the SDN controller device. If the FSB device then receives a third SDN communication from the SDN controller device that includes an FC source identifier for the server device, it may allow second FCoE data traffic between the server device and the FC storage device if that second FCoE data traffic is associated with the FC source identifier.

20 Claims, 5 Drawing Sheets

SOFTWARE DEFINED NETWORKING FCOE INITIALIZATION PROTOCOL SNOOPING BRIDGE SYSTEM

BACKGROUND

The present disclosure relates generally to information handling systems, and more particularly to the enablement of a Fibre Channel over Ethernet (FCoE) Initialization Protocol (FIP) Snooping Bridge (FSB) in Software Defined Networking (SDN) information handling system networks.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes utilized with Fibre Channel (FC) protocol networks such as, for example, Storage Area Networks (SANs), in order to provide FC switch devices that route traffic between server devices and storage devices in the SAN. In FC protocol networks, FC switch devices are generally considered "trusted devices," and devices in the FC protocol network must log into those FC switch devices before they can communicate with the rest of the FC fabric. Because FC links are point-to-point, the FC switch devices have complete control over data traffic allowed on the FC fabric, and operate to enforce zoning configurations, ensure that devices utilize their assigned addresses, and prevent undesired network behaviors.

The Fibre Channel over Ethernet (FCoE) protocol increases the flexibility of use of the FC protocol networks by encapsulating FC communications in Ethernet data traffic in order to allow FC communications to be transmitted over Ethernet networks. Such FCoE-enabled systems utilize FCoE forwarder (FCF) devices that are configured to enable the communication between the server devices and storage devices. However, if an Ethernet bridge (e.g., an intermediate switch device) is provided between a server device and the FCF device, the point-to-point assurance present in FC links is lost, and the FCF device does not have the complete authority provided in the FC switch devices discussed above. However, such issues can be remedied if it can be ensured that all FCoE data traffic to and from a server device passes through an FCF device, and that if multiple server devices access the FCF device through a single physical FCF device port, those server devices use their assigned Media Access Control (MAC) addresses. Such action create the equivalent of a point-to-point link between each server device and the FCF device. As such, an FCoE Initialization Protocol (FIP) Snooping Bridge (FSB) in the Ethernet bridge that snoops on FIP packets during the discovery and login phases allows the Ethernet bridge to implement dynamic integrity mechanisms such as Access Control Lists (ACLs) that only permit valid FCoE traffic between the server devices and the FCF device to ensure that only valid FCoE traffic is allowed on the FC fabric.

Many networks are now utilizing Software Defined Networking (SDN) protocols such as the OPENFLOW® protocol, the Open Network Environment provided by CISCO® Systems of San Jose, Calif., United States, the network virtualization platform provided by VMWARE® of Palo Alto, Calif., United States, and/or other SDN protocols known in the art. Software Defined Networking is an approach to computing networking that allows network administrators to programmatically initialize, control, and manage network behavior dynamically via open interfaces and the abstraction of lower-level functionality. This is done primarily by decoupling/disassociating the systems that make decisions about where data traffic is sent (i.e., the control plane) from the underlying systems that forward data traffic to its destination (i.e., the data plane.) In networks operating according to SDN protocols, an SDN controller device manages or controls SDN switch devices to configure those SDN switch devices to route data traffic according to centralized rules, and the SDN switch devices route that data traffic according to those rules. There currently is no mechanism for realizing the functionality of the FSB discussed above in SDN protocol networks, thus preventing the use of SDN on FC networks utilizing FCoE and Ethernet bridges between server devices and a SAN.

Accordingly, it would be desirable to provide an FSB-enabled SDN network.

SUMMARY

According to one embodiment, an Information Handling System (IHS) includes a communications subsystem; a processing system that is coupled to the communications subsystem; and a memory system that is coupled to the processing system and that includes instructions that, when executed by the processing system, cause the processing system to provide an Software Defined Networking (SDN) Fibre Channel over Ethernet (FCoE) Initialization Protocol (FIP) Snooping Bridge (FSB) engine that is configured to: prevent, in response to a first SDN communication received through the communications subsystem from an SDN controller device, first FCoE data traffic between a server device and an FCF device that are each coupled to the communications subsystem; allow, in response to a second SDN communication received through the communications subsystem from the SDN controller device and while the first FCoE data traffic is prevented between the server device and the FCF device, FIP data traffic between the server device and the FCF device; forward, through the communications subsystem to the SDN controller device, FC login communications included in the FIP data traffic between the server device and the FCF device; receive, through the communications subsystem from the SDN controller device subsequent to forwarding the FC login communications, a third SDN communication that includes an FC source identifier for the server device; and allow second FCoE data traffic between the server device and the FCF device in response to determining that the second FCoE data traffic is associated with the FC source identifier.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
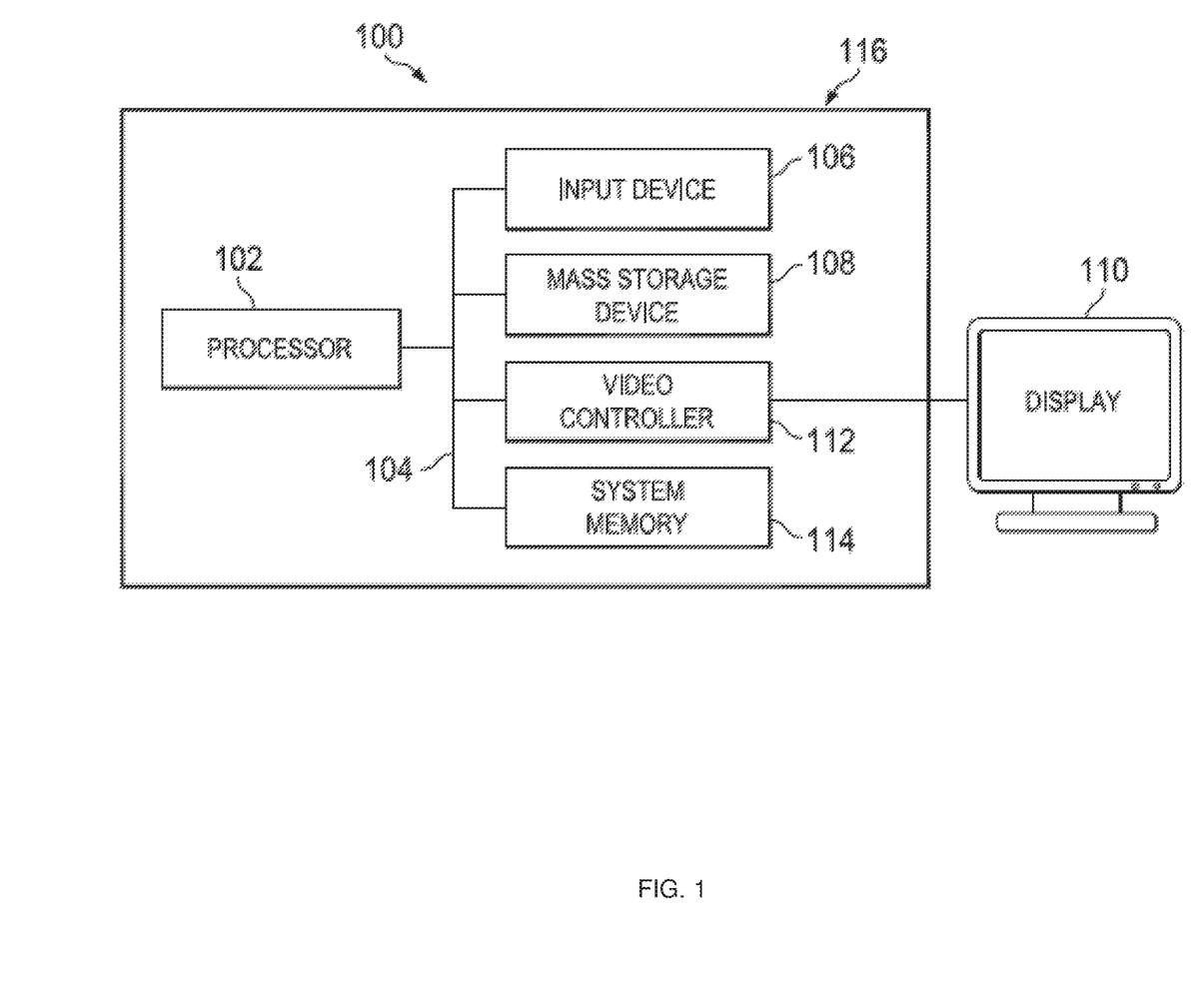
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
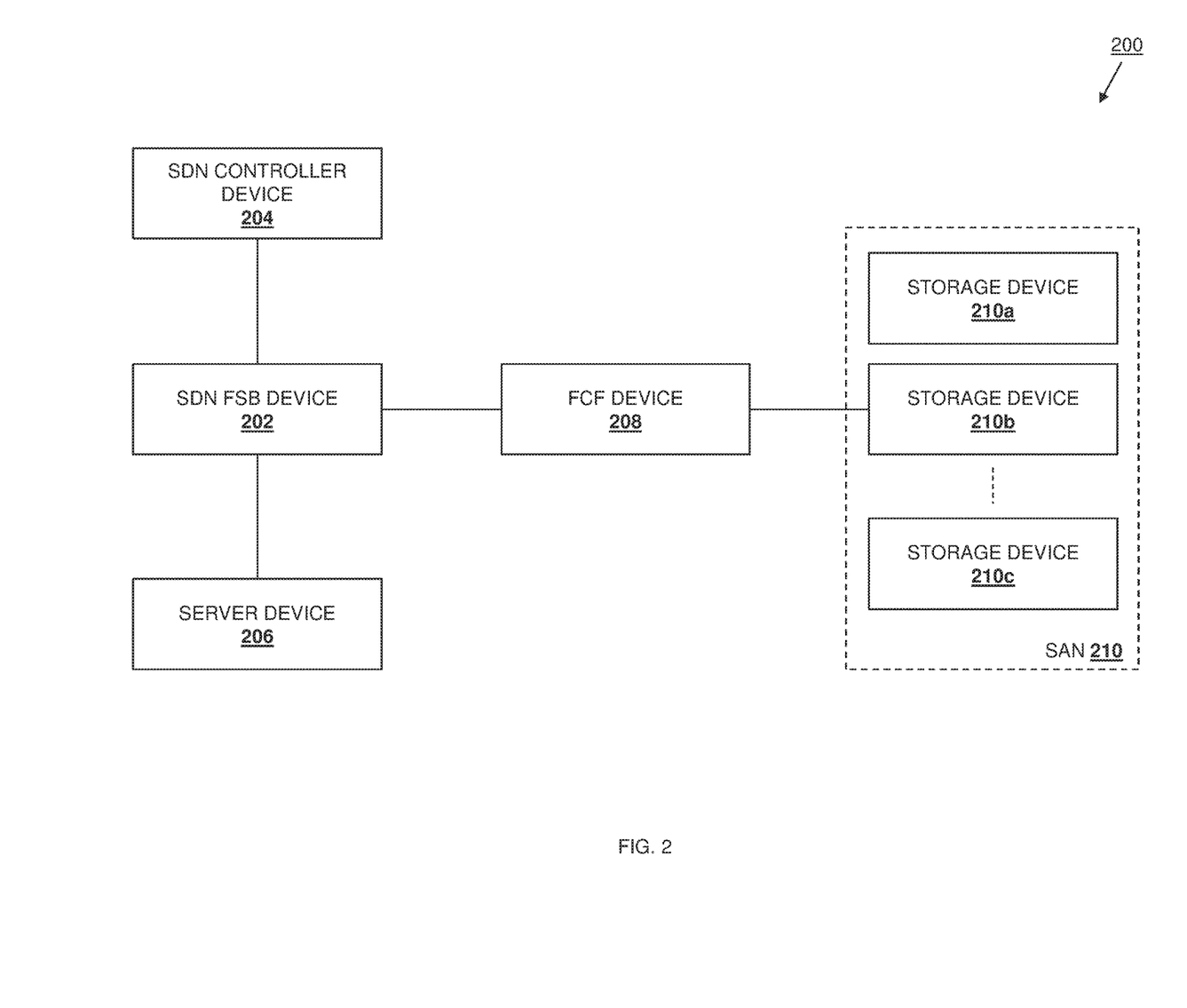
FIG. 2 is a schematic view illustrating an embodiment of an FSB-enabled SDN system.

Referring now to FIG. 2, an embodiment of a Fibre Channel over Ethernet (FCoE) Initialization Protocol (FIP) Snooping Bridge (FSB)-enabled Software Defined Networking (SDN) system 200 is illustrated. In the illustrated embodiment, the FSB-enabled SDN system 200 includes an SDN FSB device 202. While only a single SDN FSB device is illustrated in the FSB-enabled SDN system 200, one of skill in the art in possession of the present disclosure will recognize that network fabrics may (and typically will) include many more SDN FSB devices, and the inclusion of additional SDN FSB devices in the FSB-enabled SDN system 200 that operate similarly to the SDN FSB device 202 will fall within the scope of the present disclosure as well. In an embodiment, the SDN FSB device 202 may be the IHS 100 discussed above with reference to FIG. 1, and/or may include some or all of the components of the IHS 100. In the specific embodiments discussed below, the SDN FSB device 202 is provided by a switch device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well.

In the illustrated embodiment, an SDN controller device 204 is coupled to the SDN FSB device 202. While only a single SDN controller device is illustrated in the FSB-enabled SDN system 200, one of skill in the art in possession of the present disclosure will recognize that network fabrics may include more SDN controller devices, and the inclusion of additional SDN controller devices in the FSB-enabled SDN system 200 that operate similarly to the SDN controller device 204 will fall within the scope of the present disclosure as well. In an embodiment, the SDN controller device 204 may be the IHS 100 discussed above with reference to FIG. 1, and/or may include some or all of the components of the IHS 100. In the specific embodiments discussed below, the SDN controller device 204 is provided by a computing device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well.

In the illustrated embodiment, a server device 206 is also coupled to the SDN FSB device 202. While only a single server device is illustrated in the FSB-enabled SDN system 200, one of skill in the art in possession of the present disclosure will recognize that network fabrics may (and typically will) include many more server devices, and the inclusion of additional server devices in the FSB-enabled SDN system 200 that operate similarly to the server device 206 will fall within the scope of the present disclosure as well. In an embodiment, the server device 206 may be the IHS 100 discussed above with reference to FIG. 1, and/or may include some or all of the components of the IHS 100. In the illustrated embodiment, an FCoE Forwarder (FCF) device 208 is also coupled to the SDN FSB device 202. While only a single FCF device is illustrated in the FSB-enabled SDN system 200, one of skill in the art in possession of the present disclosure will recognize that network fabrics may include more FCF devices, and the inclusion of additional FCF devices in the FSB-enabled SDN system 200 that operate similarly to the FCF device 208 will fall within the scope of the present disclosure as well. In an embodiment, the FCF device 208 may be the IHS 100 discussed above with reference to FIG. 1, and/or may include some or all of the components of the IHS 100. In the specific embodiments discussed below, the FCF device 208 is provided by an FCoE-capable FC switch device, although other types of FCF devices may fall within the scope of the present disclosure as well.

In the illustrated embodiment, a Storage Area Network (SAN) 210 is also coupled to the FCF device 208, and includes a plurality of storage devices 210a, 210b, and up to 210c. In an embodiment, the SAN 210 may be the IHS 100 discussed above with reference to FIG. 1, and/or may include some or all of the components of the IHS 100. In the specific embodiments discussed below, the storage devices 210a-c in the SAN 210 are provided by FC storage devices, although other types of storage devices may fall within the scope of the present disclosure as well. While a specific FSB-enabled SDN system has been illustrated and described, one of skill in the art in possession of the present disclosure will recognize that a variety of different devices and/or device configurations (other than those illustrated in FIG. 2) may be utilized to provide a FSB-enabled SDN system that will benefit from the teachings of the present disclosure and thus fall within its scope as well.

Figure 3:
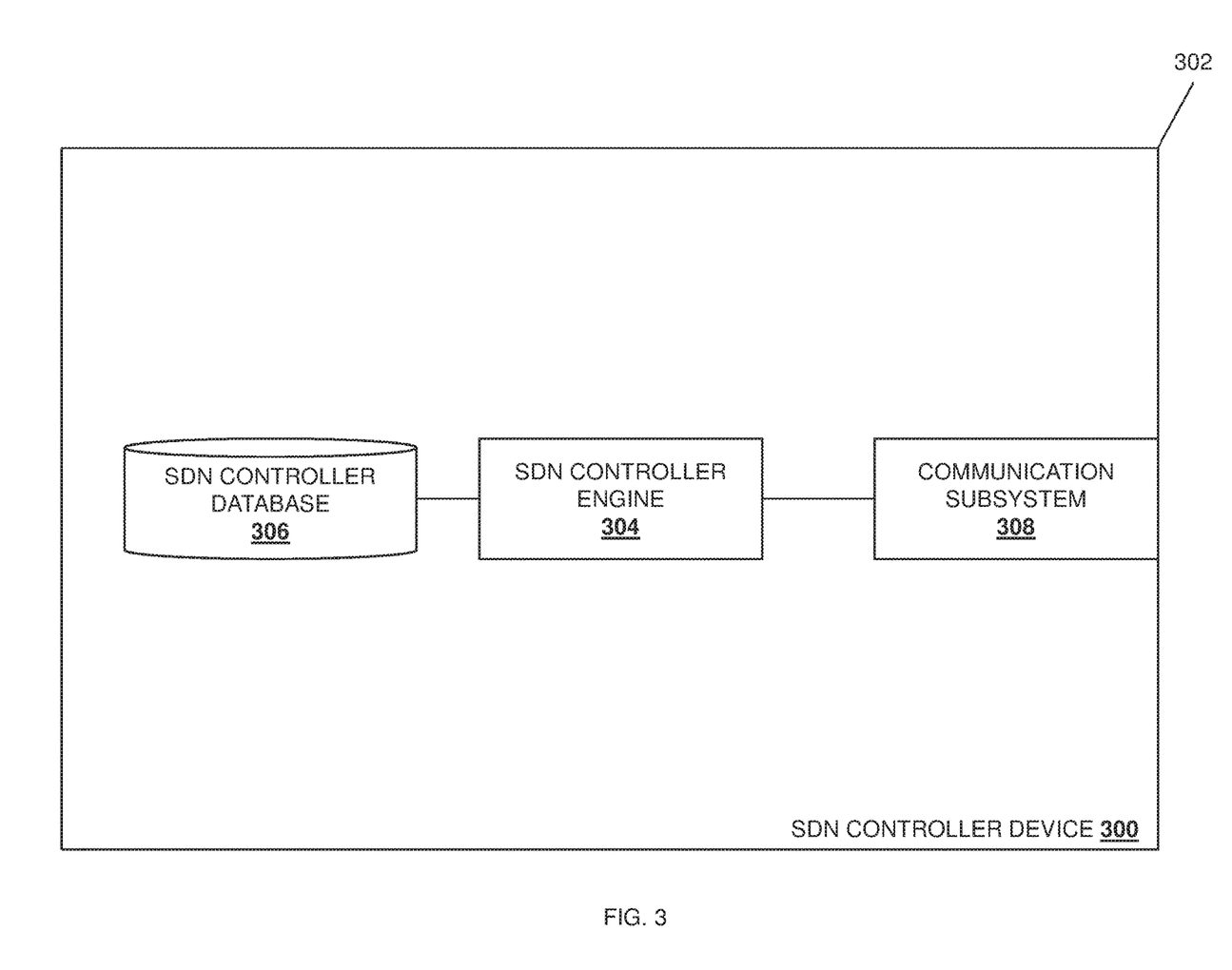
FIG. 3 is a schematic view illustrating an embodiment of an SDN controller device used in the FSB-enabled SDN system of FIG. 2.

Referring now to FIG. 3, an embodiment of an SDN controller device 300 is illustrated that may be the SDN controller device 204 discussed above with reference to FIG. 2. As such, the SDN controller device 300 may be the IHS 100 discussed above with reference to FIG. 1, may include some or all of the components of the IHS 100, and in specific embodiments may be a computing device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well. In the illustrated embodiment, the SDN controller device 300 includes a chassis 302 that houses the components of the SDN controller device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an SDN controller engine 304 that is configured to perform the functions of the SDN controller engines and SDN controller devices discussed below.

The chassis 302 may also house a storage device (not illustrated, but which may include the storage device 108 discussed above with reference to FIG. 1) that is coupled to the SDN controller engine 304 (e.g., via a coupling between the storage device and the processing system) and that includes an SDN controller database 306 that stores data and/or other information utilized to provide the functionality discussed below. The chassis 302 may also house a communication subsystem 308 that is coupled to the SDN controller engine 304 (e.g., via a coupling between the communication subsystem 308 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the communication subsystem 308 may include the ports utilized for providing the links to the SDN FSB devices discussed below. While a specific embodiment of an SDN controller device has been illustrated and described, one of skill in the art in possession of the present disclosure will recognize that SDN controller devices may include a variety of other components for providing conventional SDN controller device functionality, as well as the functionality discussed below, while remaining within the scope of the present disclosure.

Figure 4:
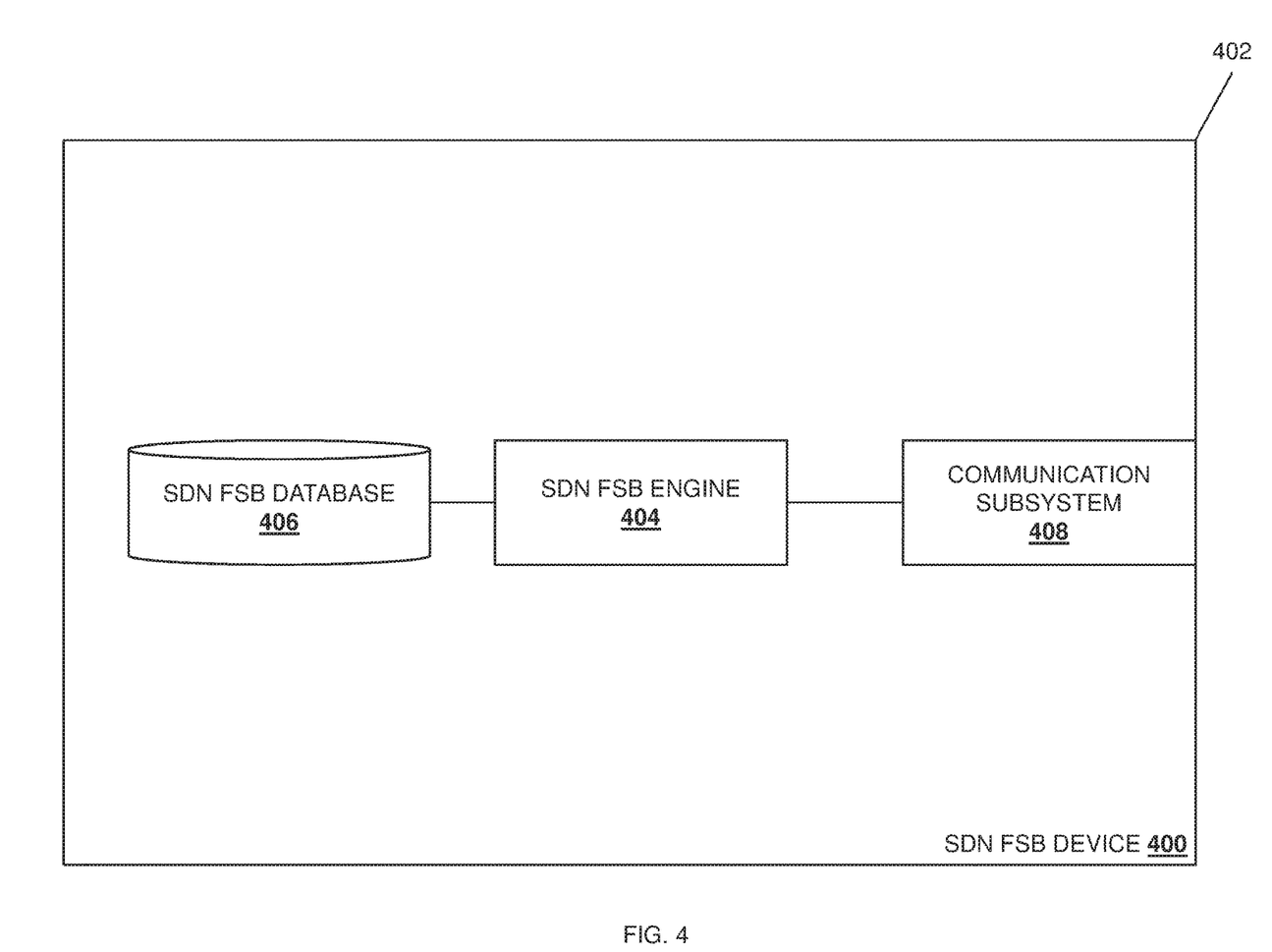
FIG. 4 is a schematic view illustrating an embodiment of an FSB device used in the FSB-enabled SDN system of FIG. 2.

Referring now to FIG. 4, an embodiment of an SDN FSB device 400 is illustrated that may be the SDN FSB device 202 discussed above with reference to FIG. 2. As such, the SDN FSB device 400 may be the IHS 100 discussed above with reference to FIG. 1, may include some or all of the components of the IHS 100, and in specific embodiments may be a switch device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well. In the illustrated embodiment, the SDN FSB device 400 includes a chassis 402 that houses the components of the SDN FSB device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an SDN FSB engine 404 that is configured to perform the functions of the SDN FSB engines and SDN FSB devices discussed below.

The chassis 402 may also house a storage device (not illustrated, but which may include the storage device 108 discussed above with reference to FIG. 1) that is coupled to the SDN FSB engine 404 (e.g., via a coupling between the storage device and the processing system) and that includes an SDN FSB database 406 that stores data and/or other information utilized to provide the functionality discussed below. The chassis 402 may also house a communication subsystem 408 that is coupled to the SDN FSB engine 404 (e.g., via a coupling between the communication subsystem 308 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the communication subsystem 408 may include the ports for providing the links to the SDN controller device 204, the server device 206, and the FCF device 208 as discussed below. While a specific embodiment of an SDN FSB device has been illustrated and described, one of skill in the art in possession of the present disclosure will recognize that SDN FSB devices may include a variety of other components for providing conventional SDN ad/or FSB device functionality, as well as the functionality discussed below, while remaining within the scope of the present disclosure.

Figure 5:
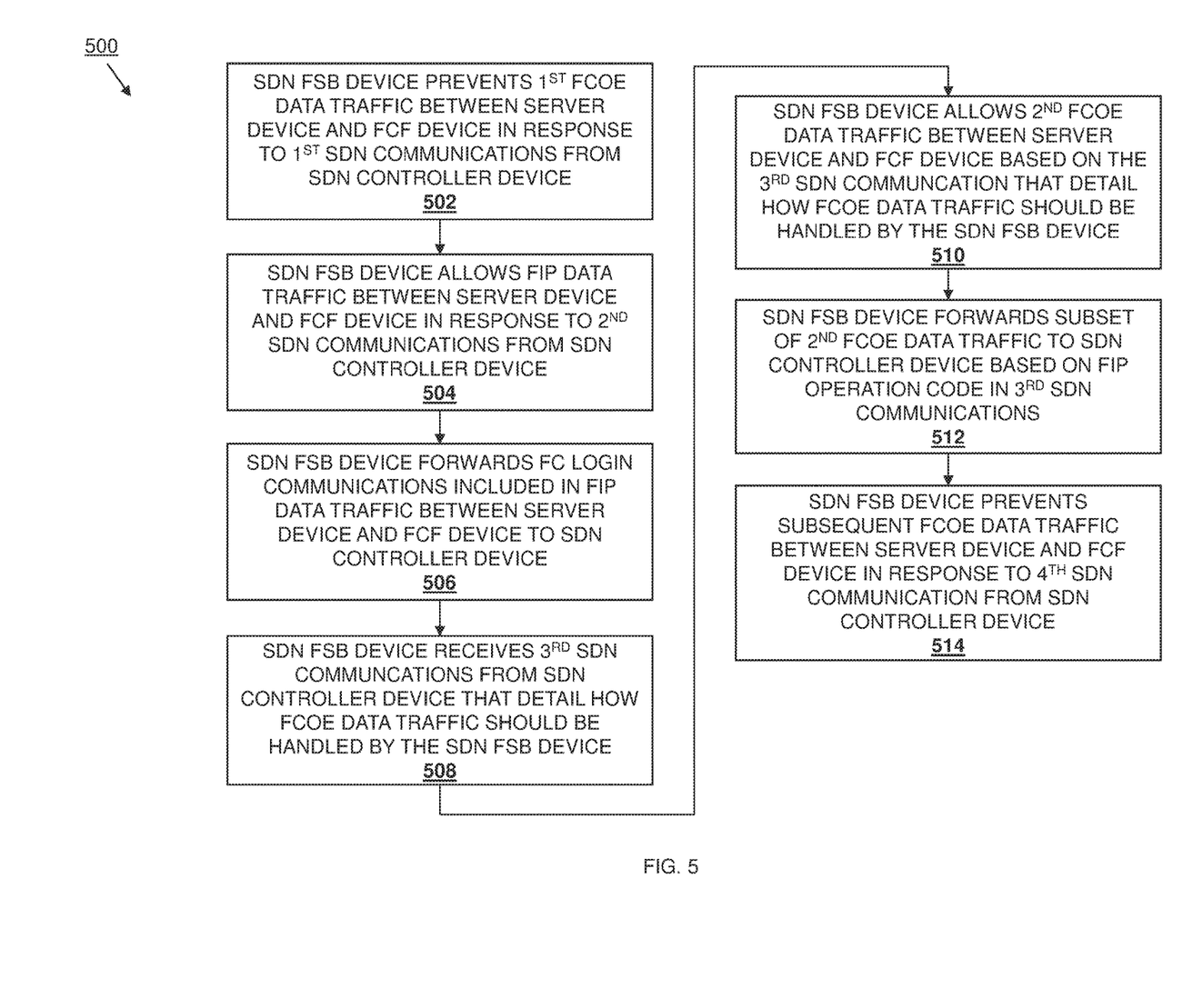
FIG. 5 is a flow chart illustrating an embodiment of a method for enabling an FSB in an SDN system.

Referring now to FIG. 5, an embodiment of a method 500 for enabling an FSB in an SDN system is illustrated. As discussed above, the systems and methods of the present disclosure provide for FSB functionality in networks that utilize SDN protocols such as, for example, the OPEN-FLOW® protocol. Such FSB functionality may be realized via extensions to SDN protocols that enable FIP snooping capabilities om SDN switch devices that are centrally controlled by an SDN controller device that operates to create flows on those SDN switch device that provide for the forwarding (to the SDN controller device) of FIP data from FIP sessions enabled by the SDN switch device between servers and FCF devices. The SDN controller device then uses the FIP data to create flows on the SDN switch devices that define the data traffic that the SDN switch device will allow to access the FC network. As such, SDN FSB switch devices are provided that operate in SDN protocol networks and that are used with FC networks that utilize FCoE and Ethernet bridges between server devices and storage devices a SAN.

The method 500 begins at block 502 where an SDN FSB device prevents first FCoE data traffic between a server device and an FCF device in response to a first SDN communication from an SDN controller device. In an embodiment, at or before block 502, the SDN FSB device 202 and/or the SDN controller device 204 may be started up, rebooted, and/or otherwise initialized and, in response, may perform an initial handshake procedure with each other. The specific details of SDN initial handshake procedures are known in the art and not discussed in detail herein, but may include the SDN FSB engine 404 in the SDN FSB device 202/400 using its communications subsystem 408 to send a "HELLO" message through a management/control connection to the SDN controller device 204/300, the SDN controller engine 304 in the SDN controller device 204/300 using its communication subsystem 308 to respond with an "ACKNOWLEDGEMENT" message through the management/control connection to the SDN FSB device 202/400, the SDN controller engine 304 in the SDN controller device 204/300 using its communications subsystem 308 to send a "HELLO" message through the management/control connection to the SDN FSB device 202/400, and the SDN FSB engine 404 in the SDN FSB device 202/400 using its communication subsystem 408 to respond with an "ACKNOWLEDGEMENT" message through the management/control connection to the SDN controller device 202/300. One of skill in the art in possession of the present disclosure will recognize that the discussion above describes an OPENFLOW® initial handshake procedure, and that other types of handshake procedures will fall within the scope of the present disclosure as well.

In addition, at or before block 502, the SDN controller device 204 may also operate to determine the features of the SDN FSB device 202. The specific details of SDN feature determination are known in the art and not discussed in detail herein, but may follow the initial handshake procedure discussed above, and may include the SDN controller engine 304 in the SDN controller device 202/300 using its communications subsystem 308 to send a "FEATURE REQUEST" message through the management/control connection to the SDN FSB device 202/400, and the SDN FSB engine 404 in the SDN FSB device 202/400 using its communication subsystem 408 to respond with a "FEATURE RESPONSE" message through the management/ control connection to the SDN controller device 202/300. As such, at or before block 502, the SDN controller device 204 may operate to discover the SDN FSB device 202 and learn the features available on the SDN FSB device 202. One of skill in the art in possession of the present disclosure will recognize that the discussion above describes an OPEN-FLOW® feature discovery procedure, and that other types of feature discovery procedures will fall within the scope of the present disclosure as well.

Furthermore, at or before block 502, the SDN controller engine 304 in the SDN controller device 204/300 may operate to configure an FCoE Media Access Control (MAC) Address Prefix (FCMAP) on the SDN controller device 204/300 (e.g., in the SDN controller database 308.) The details of FCMAPs are known in the art and thus not discussed herein in detail, but as would be understood by one of skill in the art in possession of the present disclosure, an FCMAP may be provided on an FCoE-capable switch device to identify which fabric that switch device belongs to, and may be configured to designate that particular switch devices belong to particular fabrics.

In an embodiment, at block 502, the SDN controller engine 304 in the SDN controller device 204/300 operates to provide a first SDN communication (using its communication subsystem 308) through the management/control connection to the SDN FSB device 202, and the SDN FSB engine 404 in the SDN FSB device 400 receives that first SDN communication via its communication subsystem 408. The first SDN communication may include flow rules, flow definitions, and/or other flow data that may be used to create a first flow in the SDN FSB device 202 that is configured to cause the SDN FSB engine 404 to deny first FCoE data traffic between the server device 206 and the FCF device 208. Upon receiving the first SDN communication, the SDN FSB engine 404 in the SDN FSB device 202/400 operates to utilize the flow data received from the SDN controller device 204 to create the first flow, and subsequent to creating that first flow, the SDN FSB engine 404 will operate according to that first flow to prevent any FCoE data traffic received at the SDN FSB device 202 from the server device 206 from being forwarded to the FCF device 208 or otherwise accessing the SAN 210 (or any other portion of the FC network.) In a specific embodiment, the flow data used to create the first flow may include instructions, rules, or other data that, when provided on the SDN FSB device 202/400, cause the SDN FSB engine 404 to drop packets that are FCoE type packets (i.e., such that all FCoE data traffic is blocked) and/or a particular destination address prefix according to the FCMAP configured in the SDN controller device 202 (i.e., to prevent bidirectional traffic drops for server devices connected to the fabric.)

The method 500 proceeds to block 504 where the SDN FSB device allows FIP data traffic between the server device and the FCF device in response to a second SDN communication from the SDN controller device. In an embodiment, at block 504, the SDN controller engine 304 in the SDN controller device 204/300 operates to provide a second SDN communication (using its communication subsystem 308) through the management/control connection to the SDN FSB device 202, and the SDN FSB engine 404 in the SDN FSB device 400 receives that second SDN communication via its communication subsystem 408. The second SDN communication may include flow rules, flow definitions, and/or other flow data that may be used to create a second flow in the SDN FSB device 202 that is configured to cause the SDN FSB engine 404 to allow FIP data traffic between the server device 206 and the FCF device 208. Upon receiving the second SDN communication, the SDN FSB engine 404 in the SDN FSB device 202/400 operates to utilize the flow data received from the SDN controller device 204 to create the second flow, and subsequent to creating that flow, the SDN FSB engine 404 will operate to allow any FIP data traffic transmitted between the server device 206 to the FCF device 208 (e.g., by forwarding that FIP data traffic between the server device 206 to the FCF device 208.)

In a specific example, the second SDN communications provided by the SDN controller device 204 to the SDN FSB device 202 may include OPENFLOW® "FLOW MODIFY" messages having the flow data discussed above. For example, the OPENFLOW® "FLOW MODIFY" message(s) may include:

```
/* OXM Flow match field types for OpenFlow basic class. */
enum oxm_ofb_match_fields {
OFPXMT_OFB_IN_PORT = 0, /* Switch input port. */
OFPXMT_OFB_IN_PHY_PORT = 1, /* Switch physical input port. */
OFPXMT_OFB_METADATA = 2, /* Metadata passed between tables. */
OFPXMT_OFB_ETH_DST = 3, /* Ethernet destination address. */
OFPXMT_OFB_ETH_SRC = 4, /* Ethernet source address. */
OFPXMT_OFB_ETH_TYPE = 5, /* Ethernet frame type. */
OFPXMT_OFB_VLAN_VID = 6, /* VLAN id. */
OFPXMT_OFB_VLAN_PCP = 7, /* VLAN priority. */
OFPXMT_OFB_IP_DSCP = 8, /* IP DSCP (6 bits in ToS field). */
OFPXMT_OFB_IP_ECN = 9, /* IP ECN (2 bits in ToS field). */
OFPXMT_OFB_IP_PROTO = 10, /* IP protocol. */
OFPXMT_OFB_IPV4_SRC = 11, /* IPv4 source address. */
OFPXMT_OFB_IPV4_DST = 12, /* IPv4 destination address. */
OFPXMT_OFB_TCP_SRC = 13, /* TCP source port. */
OFPXMT_OFB_TCP_DST = 14, /* TCP destination port. */
OFPXMT_OFB_UDP_SRC = 15, /* UDP source port. */
.... .... .... .... .... .... .... .... .... .... .... .... .... .... .... ....
.... .... .... .... .... .... .... .... .... .... .... .... .... .... .... ....
OFPXMT_OFB_IPV6_FLABEL = 28, /* IPv6 Flow Label. */
OFPXMT_OFB_ICMPV6_TYPE = 29, /* ICMPv6 type. */
OFPXMT_OFB_ICMPV6_CODE = 30, /* ICMPv6 code. */
OFPXMT_OFB_ICMPV6_ND_TARGET = 31, /* Target address for ND. */
OFPXMT_OFB_ICMPV6_ND_SLL = 32, /* Source link-layer for ND. */
OFPXMT_OFB_ICMPV6_ND_TLL = 33, /* Target link-layer for ND. */
OFPXMT_OFB_MPLS_LABEL = 34, /* MPLS label. */
OFPXMT_OFB_MPLS_TC = 35, /* MPLS TC. */
OFPXMT_OFB_MPLS_BOS = 36, /* MPLS BoS bit. */
OFPXMT_OFB_PBB_ISID = 37, /* PBB I-SID. */
OFPXMT_OFB_TUNNEL_ID = 38, /* Logical Port Metadata. */
OFPXMT_OFB_IPV6_EXTHDR = 39, /* IPv6 Extension Header pseudo-field. */
OFPXMT_OFB_PBB_UCA = 41, /* PBB UCA header field. */
OFPXMT_OFB_TCP_FLAGS = 42, /* TCP flags. */
OFPXMT_OFB_ACTSET_OUTPUT = 43, /* Output port from action set metadata. */
OFPXMT_OFB_PACKET_TYPE = 44, /* Packet type value. */
OFPXMT_OFB_FC_SID = 45, /* Fiber Channel Source Identifier. */
OFPXMT_OFB_FC_DID = 46, /* Fiber Channel Destination Identifier. */
OFPXMT_OFB_FC_OPCODE = 47, /* FIP Operational Code. */
};
```

One of skill in the art in possession of the present disclosure will recognize that "OFPXMT_OFB_FC_SID=45, /* Fiber Channel Source Identifier. */" in the OPENFLOW® "FLOW MODIFY" message(s) above includes an FC source identifier that may be utilized to define at least a portion of a flow in the SDN FSB device 202 that is configured to cause the SDN FSB device 202 to only allow data traffic from the server device 206 if that data traffic identifies a Media Access Control (MAC) address of the SDN FSB device 202 that is bound to the Fibre Channel Source Identifier in the OPENFLOW® "FLOW MODIFY" message(s). One of skill in the art in possession of the present disclosure will also recognize that "OFPXMT_OFB_FC_DID=46, /* Fiber Channel Destination Identifier. */" in the OPENFLOW® "FLOW MODIFY" message(s) above includes an FC destination identifier that may be utilized to define at least a portion of a flow in the SDN FSB device 202 that is configured to cause the SDN FSB device 202 to only allow data traffic to a storage device in the SAN 210 if that data traffic identifies a Media Access Control (MAC) address of the storage device that is bound to the Fibre Channel destination Identifier in the OPENFLOW® "FLOW MODIFY" message(s). One of skill in the art in possession of the present disclosure will also recognize that "OFPXMT_OFB_FC_OPCODE=47, /* FIP Operational Code. */" in the OPENFLOW® "FLOW MODIFY" message(s) above includes a FIP operational code that may be utilized to define at least a portion of a flow in the SDN FSB device 202 that is configured to cause the SDN FSB device 202 to forward particular data traffic (e.g., data traffic with a particular FIP operational code) to the SDN controller device 204. While a particular OPENFLOW® "FLOW MODIFY" message has been described, one of skill in the art in possession of the present disclosure will recognize that other types of SDN flow modification messages will fall within the scope of the present disclosure as well.

In some embodiments, the OPENFLOW® "FLOW MODIFY" message(s) sent at block 508 may include the FC source identifier (and associated information) that is configured to cause the SDN FSB device 202 to only allow data traffic from the server device 206 if that data traffic identifies a Media Access Control (MAC) address of the SDN FSB device 202 that is bound to the Fibre Channel Source Identifier in the OPENFLOW® "FLOW MODIFY" message(s) (e.g., the "OFPXMT_OFB_FC_SID=45, /* Fiber Channel Source Identifier. */" portion discussed above), while not including the FC destination identifier (and associated information) that is configured to cause the SDN FSB device 202 to only allow data traffic to a storage device in the SAN 210 if that data traffic identifies a Media Access Control (MAC) address of the storage device that is bound to the Fibre Channel destination Identifier in the OPENFLOW® "FLOW MODIFY" message(s) (e.g., the "OFPXMT_OFB_FC_DID=46, /* Fiber Channel Destination Identifier. */" portion discussed above.) In other words, data traffic allowed on the FC network by the SDN FSB device 202 may only be restricted by the server devices that are allowed to provide that data traffic (e.g., that include MAC addressees bound to particular FC source identifiers), while allowing that data traffic to any storage devices in the SAN 210, and not restricting the data traffic that is forwarded by the SDN FSB device 202 to the SDN controller device 204.

However, one of skill in the art in possession of the present disclosure will recognize that restricting of data traffic entering the FC network based on whether that data traffic identifies a Media Access Control (MAC) address of the storage device that is bound to the Fibre Channel destination Identifier in the OPENFLOW® "FLOW MODIFY" message(s) may provide for enhanced FC network security, while the configuration of the SDN FSB device 202 to forward particular data traffic (e.g., data traffic with a particular FIP operational code) to the SDN controller device 204 may provide efficiencies that ensure that the SDN controller device 204 is not repeatedly provided information that it does not need or use. As such either or both of these configurations (i.e., the FC destination identifier and associated information, and/or the associated information) may be provided along with the FC source identifier and associated information that is configured to cause the SDN FSB device 202 to only allow data traffic from the server device 206 if that data traffic identifies a Media Access Control (MAC) address of the SDN FSB device 202 that is bound to the Fibre Channel Source Identifier in the OPENFLOW® "FLOW MODIFY" message(s) while remaining within the scope of the present disclosure.

The method 500 proceeds to block 506 where the SDN FSB device forwards FC login communications included in the FIP data traffic between the server device and the FCF device to the SDN controller device. In an embodiment, the SDN FSB engine 404 in the SDN FSB device 202/400 may use its communication subsystem 408 to forward FC login communications over the management/control connection to the SDN controller device 204, and the SDN controller engine 304 in the SDN controller device 204/300 may receive those FC login communications via its communications subsystem 308. For example, at block 506, the server device 206 and the FCF device 208 may operate to perform an FCoE Initialization Protocol (FIP) that, as would be understood by one of skill in the art in possession of the present disclosure, includes the exchange of FIP data traffic may include FC login communications such as VLAN discovery solicitations and advertisements in order to, for example, identify to the server device 206 a Virtual Local Area Network (VLAN) for FC communications with the SAN 210; FCF discovery solicitations and advertisements in order to, for example, obtain by the server device 206 a MAC address of the FCF device 208; and Fabric Logins (FLOGIs)/Fabric Discoveries (FDISCs) and FLOGI Accepts/FDISC Accepts in order to, for example, login the server device 206 to the FC fabric. As would be understood by one of skill in the art in possession of the present disclosure, the FIP results in server devices receiving authorized MAC addresses, and the OPENFLOW® "FLOW MODIFY" messages discussed above may cause the SDN FSB engine 404 in the SDN FSB device 202/400 to trap packets including "ALL_FCF_MAC_ADDRESS" packets, "ALL_ENODE_MAC_ADDRESS" packets, "FIP FLOGI" packets, and/or other packets that would be apparent to one of skill in the art in possession of the present disclosure. While an example of specific FC login communications have been described, one of skill in the art in possession of the present disclosure will recognize that other FC login communications may fall within the scope of the present disclosure as well.

In some embodiments of block 506, the SDN FSB device 202 may forward the SDN controller device 204 all of the FC login communications included in the FIP data traffic between the server device 206 and the FCF device 208 (e.g., based on the flow defined by the second SDN communication discussed above.) However, In other embodiments of block 506, the SDN FSB device 202 may forward a subset of the FC login communications included in the FIP data traffic between the server device 206 and the FCF device 208 (e.g., based on the flow defined by the second SDN communication discussed above.) In a specific example, the SDN FSB engine 404 in the SDN FSB device 202/400 may utilize the FIP operational code and associated information received from the SDN controller device 204 to determine the subset of the FC login communications included in the FIP data traffic between the server device 206 and the FCF device 208 that will be forwarded to the SDN controller device 204. In a specific example, the FIP operational code and associated information received from the SDN controller device 204 may identify a FIP operational code associated with the FLOGIs/FDISCs and FLOGI Accepts/FDISC Accepts that may be used to login the server device 206 to the FC fabric and, thus, at block 506 the SDN FSB engine 304 in the SDN FSB device 202/300 may forward the FC login communications that may be limited to FLOGIs/FDISCs and FLOGI Accepts/FDISC Accepts transmitted by the SDN FSB device 202 between the server device 206 and the FCF device 208. However, the forwarding to the SDN controller device 204 of other FC login communications transmitted by the SDN FSB device 202 between the server device 206 and the FCF device 208 will fall within the scope of the present disclosure as well.

The method 500 proceeds to block 508 where the SDN FSB device receives third SDN communications from the SDN controller device that detail how FCoE data traffic should be handled by the SDN FSB device. In an embodiment, at block 508, the SDN controller engine 304 in the SDN controller device 204/300 may use the FC login communications received at block 506 to determine how FCoE data traffic should be handled by the SDN FSB device 202 and, in response, use its communication subsystem 308 provide a third SDN communication through the management/control connection to the SDN FSB device 202/400 such that the SDN FSB engine 404 receives that third SDN communication via its communication subsystem 408. In an embodiment, the third SDN communication may include flow instructions, flow rules, and/or other flow data that is configured to create a third flow in the SDN FSB device 202 that is configured to cause the SDN FSB engine 404 to allow FCoE data traffic between the server device 206 and the FCF device 208 if that FCoE traffic includes a particular FC source identifier. For example, the SDN controller engine 304 in the SDN controller device 204/300 may learn the FC identifier and the FCMAP assigned to the server device 206 via FLOGI reply messages included in the FC login communications received at block 506, and then may push a flow to the SDN FSB device 220 to allow packets received from that server device 206 via a combination of an FC source identifier and FCMAP information associated with that server device 206. One of skill in the art in possession of the present disclosure will recognize that the MAC address of the server device 206 may be a combination of the FCMAP and FC identifier for the server device 206, and a combination of the server device MAC address and FC source identifier may be used to ensure that the server device 206 registered via a FLOGI is the source of an FCoE packet that encapsulates the FC packet with the correct FC source identifier.

However, as discussed above, in some embodiments the third SDN communication may include flow instructions, flow rules, and/or other flow data that is configured to create a third flow in the SDN FSB device 202 that is configured to cause the SDN FSB engine 404 to allow FCoE data traffic between the server device 206 and the FCF device 208 if that FCoE traffic includes both a particular FC source identifier and a particular FC destination identifier. Upon receiving the third SDN communication, the SDN FSB engine 404 in the SDN FSB device 202/400 operates to utilize the flow data received from the SDN controller device 204 to create the third flow.

The method 500 proceeds to block 510 where the SDN FSB device allows second FCoE data traffic between the server device and the FCF device based on the third SDN communications that detail how FCoE data traffic should be handled by the SDN FSB device. In an embodiment, at block 510, the server device 206 may generate and send second FCoE data traffic that is destined for the SAN 210 to the SDN FSB device 202. However, subsequent to creating the third flow at block 508, the SDN FSB engine 404 will operate to only allow FCoE data traffic received at the SDN FSB device 202 from the server device 206 to be forwarded to the FCF device 208 or otherwise access the SAN 210 (or any other portion of the FC network) if it includes either the FC source identifier discussed above, or both the FC source identifier and the FC destination identifier As such, at block 510, the SDN FSB engine 404 in the SDN FSB device 202/400 may allow some FCoE data traffic to the FCF device 208 (e.g., the FCoE data traffic from the server device 206 discussed above) and/or drop some FCoE traffic directed to the FCF device, based on the third flow.

The method 500 proceeds to block 512 where the SDN FSB device forwards a subset of the second FCoE data traffic to the SDN controller device based on a FIP operational code in the third SDN communications. In an embodiment, at block 512, the SDN FSB engine 404 in the SDN FSB device 202/300 may forward a subset of the second FCoE data traffic received at block 510 to the SDN controller device 204, and the SDN controller engine 304 in the SDN controller device 204/300 may receive that subset of the second FCoE data traffic via its communication subsystem 308. In a specific embodiment, the subset of the second FCoE data traffic may allow the SDN controller engine 304 to determine a failure to respond to a keep alive communication. For example, as part of the third flow, the SDN FSB engine 404 in the SDN FSB device 202/300 may (e.g., based on the FIP operational code received as discussed above) forward a subset of the second FCoE communications that includes keep alive packet sent by the FCF device 208 to the server device 206, and may forward any response by the server device 206 to the keep alive packet. Thus, the SDN controller engine 304 may be configured to determine if the server device 206 has not responded to the keep alive packet within some time period. In another specific embodiment, the subset of the second FCoE data traffic may include an identification of a logout by the server device 206 from the FCF device 208. While specific examples of subsets of the second FCoE data traffic have been described, one of skill in the art in possession of the present disclosure will recognize that a variety of communications between server devices and FCF devices may forwarded by the SDN FSB device to the SDN controller device at block 512 while remaining within the scope of the present disclosure.

The method 500 proceeds to block 514 where the SDN FSB device prevents subsequent FCoE data traffic between the server device and the FCF device in response to a fourth SDN communication from an SDN controller device. In an embodiment, at block 514 and in response to receiving the subset of the second FCoE data traffic at block 512, the SDN controller engine 304 in the SDN controller device 204/300 may generate fourth SDN communications and use its communication subsystem 308 to send the fourth SDN communications through the management/control connection to the SDN FSB device 202, and the SDN FSB engine 404 in the SDN FSB device 202/400 may receive that fourth SDN communication via its communication subsystem 408. Continuing with the specific embodiments discussed above, the subset of the second FCoE data traffic may allow the SDN controller engine to detect a failure to respond to a keep alive communication (e.g, the SDN controller engine 304 may be configured to determine if the server device 206 has not responded to the keep alive packet within some time period), and the fourth SDN communication may include flow instructions, flow rules, and/or other flow data that is configured to cause the SDN FSB device 202 to create a flow that prevents subsequent FCoE data traffic between the server device 206 and the FCF device 208. In another specific embodiment, the subset of the second FCoE data traffic may include an identification of a logout by the server device 206 from the FCF device 208, and the fourth SDN communication may include flow instructions, flow rules, and/or other flow data that is configured to cause the SDN FSB device 202 to create a flow that prevents subsequent FCoE data traffic between the server device 206 and the FCF device 208. As such, in either embodiment, the SDN FSB engine 404 in the SDN FSB device 202/400 may receive the fourth SDN communication via its communication subsystem 408, and create a flow that prevents subsequent FCoE data traffic between the server device 206 and the FCF device 208.

Thus, systems and methods have been described that provide for an Ethernet bridge in an SDN protocol network the ability to operate as an FSB when relaying FCoE communications from a server device to an FCF device connected to a SAN 210. As discussed above, such functionality may be enabled by first pushing a flow to the Ethernet bridge that prevents FCoE traffic between the server device and the FCF device, and then pushing a flow that causes the Ethernet bridge to allow FIP data traffic between the server device and the FCF device while also forwarding FC login communications included in that FIP data traffic to the SDN controller device. The SDN controller device may then use those FC login communications to push flows to the Ethernet bridge that cause the Ethernet bridge to allow or deny FCoE traffic between the server device and the FCF device based on whether the server device is properly logged into the FC fabric. As such, FSB functionality is enabled in Ethernet bridges that are controlled centrally by an SDN controller device and that provide FCoE data traffic to an FC network.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel over Ethernet (FCoE) Initialization Protocol (FIP) Snooping Bridge (FSB)-enabled Software Defined Networking (SDN) system, comprising:
   a Fibre Channel (FC) storage device;
   a Fibre Channel over Ethernet (FCoE) Forwarder (FCF) device coupled to the FC storage device;
   a server device;
   a Software Defined Networking (SDN) controller device; and
   an SDN FCoE Initialization Protocol (FIP) Snooping Bridge (FSB) device that couples the server device to the FCF device, and that is coupled to the SDN controller device, wherein the SDN FSB device is configured to:
      prevent, in response to a first SDN communication that is based on a SDN protocol and that is received from the SDN controller device, first FCoE data traffic between the server device and the FCF device, wherein the SDN FSB communicates SDN communications with the SDN controller device as a result of an SDN discovery procedure between the SDN controller device and the SDN FSB device;
      allow, in response to a second SDN communication that is based on the SDN protocol and that is received from the SDN controller device and while the first FCoE data traffic is prevented between the server device and the FCF device, FIP data traffic between the server device and the FCF device;

forward, to the SDN controller device, FC login communications included in the FIP data traffic between the server device and the FCF device;

receive, from the SDN controller device subsequent to forwarding the FC login communications, a third SDN communication that is based on the SDN protocol and that includes an FC source identifier for the server device; and allow second FCoE data traffic between the server device and the FCF device in response to determining that the second FCoE data traffic is associated with the FC source identifier.

2. The system of claim 1, wherein the third SDN communication includes an FC destination identifier for the FC storage device, and wherein the SDN FSB device is configured to:

allow the second FCoE data traffic between the server device and the FCF device in response to determining that the second FCoE data traffic is associated with the FC source identifier and the FC destination identifier.

3. The system of claim 1, wherein the third SDN communication includes a FIP operational code, and wherein the SDN FSB device is configured to:

forward, to the SDN controller device subsequent to receiving the third SDN communication, a subset of the second FCoE data traffic between the server device and the FCF device based on the FIP operational code.

4. The system of claim 3, wherein the subset of the second FCoE data traffic identifies a failure to respond to a keep alive communication, and wherein the SDN FSB device is configured to:

prevent, in response to a fourth SDN communication that is based on the SDN protocol and that is received from the SDN controller device subsequent to forwarding the identification of the failure to respond to the keep alive communication, subsequent FCoE data traffic between the server device and the FCF device subsequent to receiving the fourth SDN communication.

5. The system of claim 3, wherein the subset of second FCoE data traffic identifies a logout by the server device from FCF device, and wherein the SDN FSB device is configured to:

prevent, in response to a fourth SDN communication that is based on the SDN protocol and that is received from the SDN controller device subsequent to forwarding the identification of the logout by the server device from the FCF device, subsequent FCoE data traffic between the server device and the FCF device subsequent to receiving the fourth SDN communication.

6. The system of claim 1, wherein the determining that the second FCoE data traffic is associated with the FC source identifier includes determining that the second FCoE data traffic includes a Media Access Control (MAC) address associated with the FC source identifier.

7. The system of claim 1, wherein:

the first SDN communication defines a first flow that prevents the first FCoE data traffic between the server device and the FCF device;

the second SDN communication defines a second flow that allows the FIP data traffic between the server device and the FCF device; and the third SDN communication defines a third flow that allows the second FCoE data traffic between the server device and the FCF device in response to the second FCoE data traffic being associated with the FC source identifier.

8. An Information Handling System (IHS), comprising:

a communications subsystem;

a processing system that is coupled to the communications subsystem; and a memory system that is coupled to the processing system and that includes instructions that, when executed by the processing system, cause the processing system to provide an Software Defined Networking (SDN) Fibre Channel over Ethernet (FCoE) Initialization Protocol (FIP) Snooping Bridge (FSB) engine that is configured to:

prevent, in response to a first SDN communication that is based on a SDN protocol and that is received through the communications subsystem from an SDN controller device, first FCoE data traffic between a server device and an FCF device that are each coupled to the communications subsystem, wherein the communication subsystem communicates SDN communications with the SDN controller device as a result of an SDN discovery procedure between the SDN controller device and the communication subsystem;

allow, in response to a second SDN communication that is based on the SDN protocol and that is received through the communications subsystem from the SDN controller device and while the first FCoE data traffic is prevented between the server device and the FCF device, FIP data traffic between the server device and the FCF device;

forward, through the communications subsystem to the SDN controller device, FC login communications included in the FIP data traffic between the server device and the FCF device;

receive, through the communications subsystem from the SDN controller device subsequent to forwarding the FC login communications, a third SDN communication that is based on the SDN protocol and that includes an FC source identifier for the server device; and allow second FCoE data traffic between the server device and the FCF device in response to determining that the second FCoE data traffic is associated with the FC source identifier.

9. The IHS of claim 8, wherein the third SDN communication includes an FC destination identifier for a Fibre Channel (FC) storage device that is coupled to the FCF device, and wherein the SDN FSB engine is configured to:

allow the second FCoE data traffic between the server device and the FCF device in response to determining that the second FCoE data traffic is associated with the FC source identifier and the FC destination identifier.

10. The IHS of claim 8, wherein the third SDN communication includes a FIP operational code, and wherein the SDN FSB engine is configured to:

forward, through the communications subsystem to the SDN controller device subsequent to receiving the third SDN communication, a subset of the second FCoE data traffic between the server device and the FCF device based on the FIP operational code.

11. The IHS of claim 10, wherein the subset of second FCoE data traffic identifies a logout by the server device from FCF device, and wherein the SDN FSB engine is configured to:

prevent, in response to a fourth SDN communication that is based on the SDN protocol and that is received through the communications subsystem from the SDN controller device subsequent to forwarding the identification of the logout by the server device from the FCF device, subsequent FCoE data traffic between the server device and the FCF device subsequent to receiving the fourth SDN communication.

12. The IHS of claim 8, wherein the determining that the second FCoE data traffic is associated with the FC source identifier includes determining that the second FCoE data traffic includes a Media Access Control (MAC) address associated with the FC source identifier.

13. The IHS of claim 8, wherein:
the first SDN communication defines a first flow that prevents the first FCoE data traffic between the server device and the FCF device;
the second SDN communication defines a second flow that allows the FIP data traffic between the server device and the FCF device; and
the third SDN communication defines a third flow that allows the second FCoE data traffic between the server device and the FCF device in response to the second FCoE data traffic being associated with the FC source identifier.

14. A method for enabling a Fibre Channel over Ethernet (FCoE) Initialization Protocol (FIP) Snooping Bridge (FSB) in a Software Defined Networking (SDN) system, comprising:
preventing, by a Software Defined Networking (SDN) Fibre Channel over Ethernet (FCoE) Initialization Protocol (FIP) Snooping Bridge (FSB) device in response to a first SDN communication that is based on an SDN protocol and that is received from an SDN controller device, first FCoE data traffic between a server device and an FCF device, wherein the SDN FSB device communicates SDN communications with the SDN controller device as a result of an SDN discovery procedure between the SDN controller device and the SDN FSB device;
allowing, by the SDN FSB device in response to a second SDN communication that is based on an SDN protocol and that is received from the SDN controller device and while the first FCoE data traffic is prevented between the server device and the FCF device, FIP data traffic between the server device and the FCF device;
forwarding, by the SDN FSB device to the SDN controller device, FC login communications included in the FIP data traffic between the server device and the FCF device;
receiving, by the SDN FSB device from the SDN controller device subsequent to forwarding the FC login communications, a third SDN communication that is based on an SDN protocol and that includes an FC source identifier for the server device; and
allowing, by the SDN FSB device, second FCoE data traffic between the server device and the FCF device in response to determining that the second FCoE data traffic is associated with the FC source identifier.

15. The method of claim 14, wherein the third SDN communication includes an FC destination identifier for a Fibre Channel (FC) storage device that is coupled to the FCF device, and wherein the method further comprises:
allowing, by the SDN FSB device, the second FCoE data traffic between the server device and the FCF device in response to determining that the second FCoE data traffic is associated with the FC source identifier and the FC destination identifier.

16. The method of claim 14, wherein the third SDN communication includes a FIP operational code, and wherein the method further comprises:
forwarding, by the SDN FSB device to the SDN controller device subsequent to receiving the third SDN communication, a subset of the second FCoE data traffic between the server device and the FCF device based on the FIP operational code.

17. The method of claim 16, wherein the subset of the second FCoE data traffic identifies a failure to respond to a keep alive communication, and wherein the method further comprises:
preventing, by the SDN FSB device in response to a fourth SDN communication that is based on the SDN protocol and that is received from the SDN controller device subsequent to forwarding the identification of the failure to respond to the keep alive communication, subsequent FCoE data traffic between the server device and the FCF device subsequent to receiving the fourth SDN communication.

18. The method of claim 16, wherein the subset of second FCoE data traffic identifies a logout by the server device from FCF device, and wherein the method further comprises:
preventing, by the SDN FSB device in response to a fourth SDN communication that is based on the SDN protocol and that is received from the SDN controller device subsequent to forwarding the identification of the logout by the server device from the FCF device, subsequent FCoE data traffic between the server device and the FCF device subsequent to receiving the fourth SDN communication.

19. The method of claim 14, wherein the determining that the second FCoE data traffic is associated with the FC source identifier includes determining that the second FCoE data traffic includes a Media Access Control (MAC) address associated with the FC source identifier.

20. The method of claim 14, wherein:
the first SDN communication defines a first flow that prevents the first FCoE data traffic between the server device and the FCF device;
the second SDN communication defines a second flow that allows the FIP data traffic between the server device and the FCF device; and
the third SDN communication defines a third flow that allows the second FCoE data traffic between the server device and the FCF device in response to the second FCoE data traffic being associated with the FC source identifier.

* * * * *